United States Patent
Jin et al.

(10) Patent No.: US 8,830,877 B2
(45) Date of Patent: Sep. 9, 2014

(54) TRANSMITTING DEVICE, TRANSMITTING METHOD, AND RECEIVING METHOD FOR MULTICAST AND BROADCAST SERVICE

(75) Inventors: Sung-Geun Jin, Daejeon (KR); Sung Cheol Chang, Daejeon (KR); Won-Ik Kim, Daejeon (KR); Hyun Lee, Daejeon (KR); Chul Sik Yoon, Seoul (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 338 days.

(21) Appl. No.: 13/062,316

(22) PCT Filed: Aug. 28, 2009

(86) PCT No.: PCT/KR2009/004828
§ 371 (c)(1),
(2), (4) Date: Mar. 4, 2011

(87) PCT Pub. No.: WO2010/027163
PCT Pub. Date: Mar. 11, 2010

(65) Prior Publication Data
US 2011/0194479 A1    Aug. 11, 2011

(30) Foreign Application Priority Data

Sep. 5, 2008  (KR) .................. 10-2008-0087918
Aug. 11, 2009  (KR) .................. 10-2009-0073940

(51) Int. Cl.
| | | |
|---|---|---|
| *H04H 20/71* | (2008.01) |
| *H04L 1/18* | (2006.01) |
| *H04W 28/04* | (2009.01) |
| *H04L 1/00* | (2006.01) |
| *H04W 88/08* | (2009.01) |
| *H04W 4/06* | (2009.01) |
| *H04W 28/06* | (2009.01) |

(52) U.S. Cl.
CPC .............. H04L 1/1819 (2013.01); *H04W 28/04* (2013.01); *H04L 2001/0093* (2013.01); H04L 1/0057 (2013.01); *H04W 88/08* (2013.01); *H04W 4/06* (2013.01); *H04W 28/065* (2013.01)
USPC ............ 370/271; 370/332; 370/337; 370/463

(58) Field of Classification Search
USPC ......... 370/312, 332, 463, 337, 329, 328, 341, 370/401; 380/270; 714/749, 748
See application file for complete search history.

(56) References Cited

U.S. PATENT DOCUMENTS

2003/0147367 A1 *   8/2003   Pucheu et al. ................ 370/337
2004/0112800 A1     6/2004   Ogino et al.
(Continued)

FOREIGN PATENT DOCUMENTS

EP    1 482 671 A1    12/2004
EP    1628427 A1      2/2006
(Continued)

OTHER PUBLICATIONS

Nonnenmacher et al. "Parity-Based Loss Recovery for Reliable Multicast Transmission", IEEE/ACM Transactions on Networking, vol. 6, No. 4, Aug. 1998.*

(Continued)

Primary Examiner — Andrew Lai
Assistant Examiner — Jamaal Henson

(57) ABSTRACT

A transmitting device for a multicast and broadcast service according to an embodiment of the present invention includes: an encoder that receives data to generate parity; an ARQ block generator that generates a first automatic repeat request (ARQ) block by dividing the data and generates a second ARQ block by dividing the parity; a PDU generator that generates a first protocol data unit (PDU) including the first ARQ block and a second protocol unit (PDU) including the second ARQ block; and a transmitter that transmits the first PDU and the second PDU to a plurality of terminals.

14 Claims, 3 Drawing Sheets

(56) References Cited

U.S. PATENT DOCUMENTS

| | | | |
|---|---|---|---|
| 2007/0008990 A1* | 1/2007 | Torsner | 370/473 |
| 2007/0153724 A1 | 7/2007 | Cheon et al. | |
| 2007/0189226 A1* | 8/2007 | Roh et al. | 370/332 |

FOREIGN PATENT DOCUMENTS

| | | |
|---|---|---|
| JP | 2007-258976 | 10/2007 |
| KR | 10-0493158 | 6/2005 |
| KR | 10-2007-0072951 | 7/2007 |
| WO | WO 2005/022814 A1 | 3/2005 |
| WO | WO 2005/046125 A1 | 5/2005 |
| WO | WO 2005/099162 A2 | 10/2005 |

OTHER PUBLICATIONS

Written Opinion of the International Searching Authority dated Mar. 21, 2011 in connection with International Patent Application No. PCT/KR2009/004828.

Jorg Nonnenmacher, et al., "Parity-Based Loss Recovery for Reliable Multicast Transmission", IEEE/ACM Transactions on Networking, vol. 6, No. 4, Aug. 1998, p. 349-361.

\* cited by examiner

TRANSMITTING DEVICE, TRANSMITTING METHOD, AND RECEIVING METHOD FOR MULTICAST AND BROADCAST SERVICE

CROSS-REFERENCE TO RELATED APPLICATION(S)

The present application claims priority under 35 U.S.C. §365 to International Patent Application No. PCT/KR2009/004828 filed Aug. 28, 2009, entitled "TRANSMITTING DEVICE, TRANSMITTING METHOD, AND RECEIVING METHOD FOR MULTICAST AND BROADCAST SERVICE". International Patent Application No. PCT/KR2009/004828 claims priority under 35 U.S.C. §365 and/or 35 U.S.C. §119(a) to Korean Patent Application No. 10-2008-0087918 filed Sep. 5, 2008 and Korean Patent Application No. 10-2009-0073940 filed Aug. 11, 2009, and which are incorporated herein by reference into the present disclosure as if fully set forth herein.

TECHNICAL FIELD

The present invention relates to a transmitting device, a transmitting method, and a receiving method for a multicast and broadcast service.

BACKGROUND ART

A multicast and broadcast service (MBS) is a point-to-multipoint service that transmits data to multiple recipients from one source. In this service, the multiple recipients use a common resource so as to efficiently use resources. The multiple recipients can share a connection ID of a packet so as to use the common resource.

The multicast and broadcast service can provide a service by using a hybrid automatic repeat request (HARQ) scheme in a physical (PHY) layer. However, transmission performance of the HARQ scheme has a limit. Accordingly, in order to provide a more reliable service, it is necessary to support the multicast and broadcast service while securing transmission reliability in a media access control (MAC) layer.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a transmitting device, a transmitting method, and a receiving method for a multicast and broadcast service having an advantage of minimizing transmission failure by supporting the multicast and broadcast service in a media access control layer and effectively restoring a transmission error when a transmission error is generated.

Solution to Problem

An exemplary embodiment of the present invention provides a transmitting device for a multicast and broadcast service, that includes: an encoder that receives data to generate parity; an ARQ block generator that generates a first automatic repeat request (ARQ) block by dividing the data and generates a second ARQ block by dividing the parity; a PDU generator that generates a first protocol data unit (PDU) including the first ARQ block and a second protocol unit (PDU) including the second ARQ block; and a transmitter that transmits the first PDU and the second PDU to a plurality of terminals.

The encoder may be an encoding type that enables detecting and modifying an error in the unit of a symbol in a media access control layer.

The encoder may include a Reed-Solomon encoder.

The transmitter may transmit the second PDU in accordance with a response on whether or not the first ARQ block is received by the plurality of terminals after transmitting the first PDU.

The transmitter may transmit the second PDU including the minimum number of second ARQ blocks that allows the plurality terminals to restore the lost first ARQ block to the terminals.

The minimum number of second PDUs that can restore the first ARQ block may be determined depending on a response of a terminal having the most lost first ARQ blocks among the plurality of terminals.

Each of the first PDU and the second PDU may further include a header and error checking fields, and the header may include control information of the first and second ARQ blocks.

The transmitting device may further include a controller that controls a transmission operation of the transmitter depending on windows of the transmitter and the terminal.

Another embodiment of the present invention provides a transmitting method for a multicast and broadcast service in a base station, that includes: generating parity by encoding data; generating a first ARQ block by dividing the data; generating a second ARQ block by dividing the parity; generating a first PDU including the first ARQ block; generating a second PDU including the second ARQ block; transmitting the first PDU to a plurality of terminals; receiving a response on whether or not the first ARQ block is normally received from the plurality of terminals; and transmitting the second PDU to the plurality of terminals in accordance with the response on whether or not the first ARQ block is normally received.

Transmitting the second PDU may include transmitting the second PDU including the minimum number of second ARQ blocks that allows the plurality of terminals to restore the lost first ARQ block.

The minimum number of second ARQ blocks that can restore the first ARQ block may be determined depending on a response of a terminal having the most lost first ARQ blocks among the plurality of terminals.

The transmitting method may further include receiving a response on whether or not the lost first ARQ block is successfully restored from the plurality of terminals, and retransmitting the second PDU to the plurality of terminals when the response on whether or not the lost first ARQ block is successfully restored is a non-acknowledge response.

The transmitting method may further include repeating receiving the response on whether or not the lost first ARQ block is successfully restored and retransmitting the second PDU to the plurality of terminals.

The transmitting method may further include transmitting the lost first ARQ block to the plurality of terminals when the second PDU is exhausted.

The encoding may include Reed-Solomon encoding.

Yet another embodiment of the present invention provides a receiving method for a multicast and broadcast service in a terminal, that includes: receiving a first PDU including a first ARQ block generated by dividing data; transmitting a response on whether or not the first ARQ block is normally received to a base station; receiving a second PDU including a second ARQ block generated by dividing parity that is generated by encoding the data when the lost first ARQ block is generated due to abnormal reception of the first ARQ block; restoring the lost first ARQ block by using the second ARQ block; and transmitting the restoration result to the base station.

The receiving method may further include re-receiving the second PDU when the response on whether or not the lost first ARQ block is successfully restored is a non-acknowledge response.

The receiving method may further include repeating transmitting the restoration result to the base station and re-receiving the second PDU.

The receiving method may further include transmitting the lost first ARQ block when the second PDU is exhausted.

The encoding may include Reed-Solomon encoding.

Advantageous Effects of Invention

According to an embodiment of the present invention, it is possible to support a multicast and broadcast service while securing transmission reliability by using an ARQ in a media access control layer.

MODE FOR THE INVENTION

Figure 1:
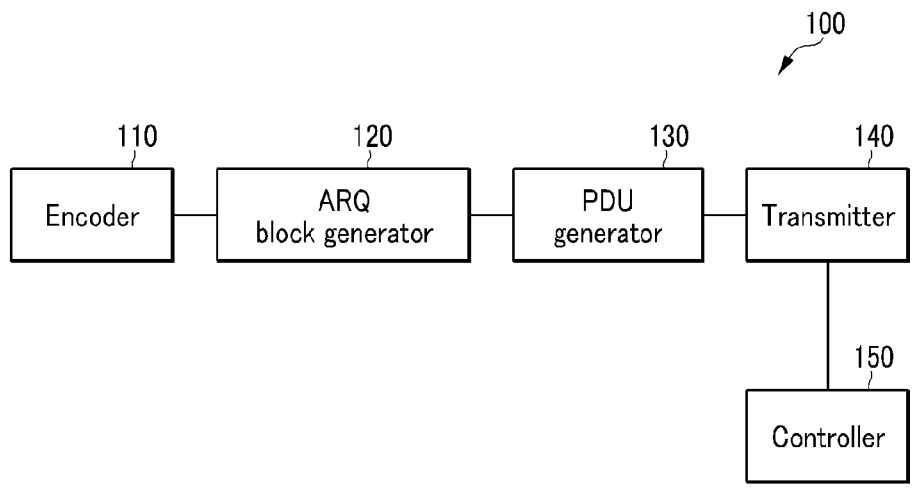
FIG. 1 is a schematic block diagram of a transmitting device for a multicast and broadcast service according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising" will be understood to imply the inclusion of stated elements but not the exclusion of any other elements.

In the specification, a terminal may designate a mobile station (MS), a mobile terminal (MT), a subscriber station (SS), a portable subscriber station (PSS), user equipment (UE), an access terminal (AT), etc., and may include the entire or partial functions of the terminal, the mobile terminal, the subscriber station, the portable subscriber station, the user equipment, the access terminal, etc.

In the specification, a base station (BS) may designate an access point (AP), a radio access station (RAS), a node B, an evolved node B (eNodeB), a base transceiver station (BTS), a mobile multihop relay (MMR)-BS, etc., and may include the entire or partial functions of the access point, the radio access station, the node B, the evolved node B, the base transceiver station, the MMR-BS, etc.

Hereinafter, a transmitting device for a multicast and broadcast service according to an embodiment of the present invention will be described in detail with reference to the accompanying drawings.

FIG. 1 is a schematic block diagram of a transmitting device for a multicast and broadcast service according to an embodiment of the present invention, and FIGS. 2 to 6 are diagrams illustrating a data unit inputted into a transmitting device for a multicast and broadcast service or outputted from the transmitting device of FIG. 1.

Referring to FIG. 1, the multicast and broadcast service (MBS) transmitting device 100 includes an encoder 110, an automatic repeat request (ARQ) block generator 120, a protocol data unit (PDU) generator 130, a transmitter 140, and a controller 150.

Figure 2:
FIGS. 2 to 6 are diagrams illustrating a data unit inputted into a transmitting device for a multicast and broadcast service or outputted from the transmitting device of FIG. 1.
Figure 3:
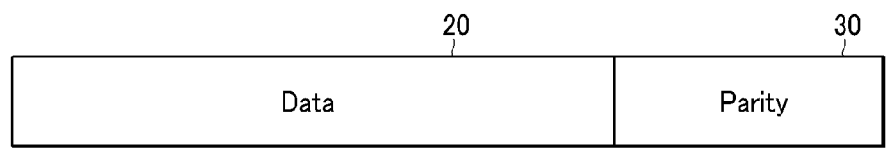

The encoder 110 receives and encodes data 20 of FIG. 2 to be actually transmitted to generate parity 30, and outputs the parity 30 as a data unit having a form shown in FIG. 3.

The encoder 110 uses an encoding type that enables detecting and modifying an error in the unit of a symbol in a media access control layer. For example, the encoder 110 may be a Reed-Solomon encoder.

The Reed-Solomon code is expressed in a form of Rs(n, k). This means that n symbols are outputted by adding a parity symbol for modifying the error to k input data symbols. That is, the parity 30 having (n−k) symbols is added to the data 20. The value of n and the value of k may vary depending on a state of a channel.

The Reed-Solomon encoder generates the parity 30 by binding service data units (SDUs) with each other when the size of the SDU is smaller than a data symbol required for the Reed-Solomon encoder and dividing the SDU when the size of the SDU is larger than the required data symbol to generate the parity 30.

Figure 4:
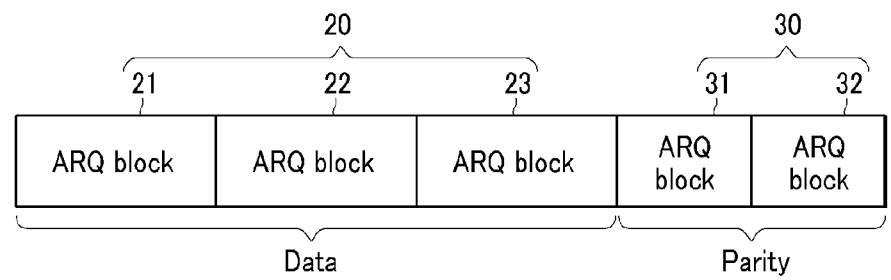

The ARQ block generator 120 divides the data 20 into a plurality of ARQ blocks 21, 22, and 23 as shown in FIG. 4 in accordance with a condition suitable for the multicast and broadcast service, and also divides the parity 30 into a plurality of ARQs 31 and 32.

Figure 5:
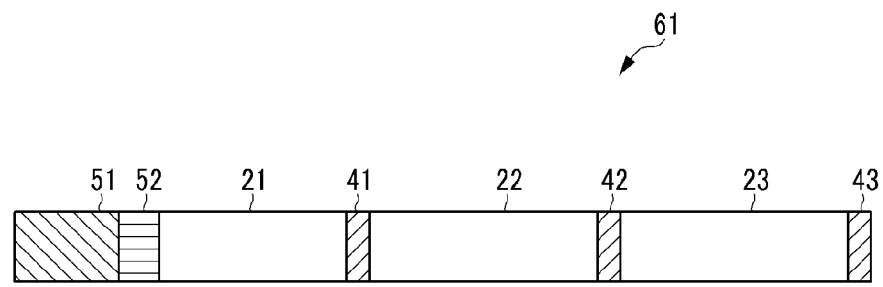
Figures 6, 7:
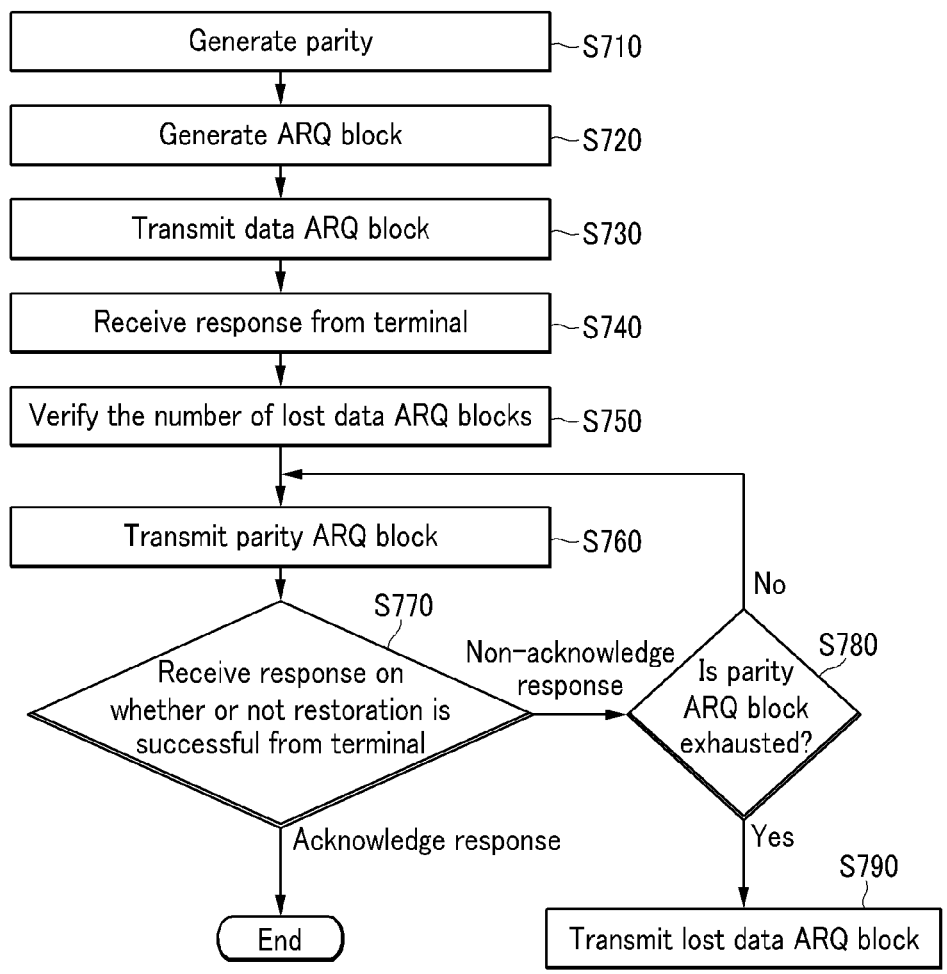
FIG. 7 is a flowchart illustrating a transmitting method for a multicast and broadcast service according to an embodiment of the present invention.

The PDU generator 130 generates a data PDU 61 shown in FIG. 5 and a parity PDU 62 shown in FIG. 6.

Referring to FIG. 5, the data PDU 61 includes a header 51, a subheader 52, the plurality of data ARQ blocks 21, 22, and 23, and a plurality of error checking fields 41, 42, and 43.

The header 51 may include information for general administration, control, etc., of the data ARQ blocks 21, 22, and 23. For example, the header 51 discriminates whether the ARQ blocks 21, 22, and 23 are the data ARQ block or the parity ARQ block, and contains information on which SDU the data ARQ blocks 21, 22, and 23 belong to and information on whether or not the data ARQ blocks 21, 22, and 23 are divided from one SDU or generated by binding several SDUs with each other.

The subheader 52 may include information for administration and control of the ARQ, such as a serial number of the ARQ block, for example. Meanwhile, the ARQ information may be included in the header 51. In this case, the subheader 52 may be omitted.

The error checking fields 41, 42, and 43 are added after the plurality of data ARQ blocks 21, 22, and 23. Cyclic redundancy checking (CRC) may be used as error checking of the error checking fields 41, 42, and 43.

Referring to FIG. 6, the parity PDU 62 includes a header 53, a subheader 54, the plurality of parity ARQ blocks 31 and 32, and a plurality of error inspection fields 44 and 45. The header 53, the subheader 54, and the error checking fields 44 and 45 of the parity PDU 62 are similar to the components of the data PDU 61.

Referring back to FIG. 1, the transmitter 140 transmits the data PDU 61 and the parity PDU 62 that are generated in the PDU generator 130 to a terminal. At this time, transmission of the parity PDU 62 can be adjusted depending on an acknowledge response (ACK) and a non-acknowledge response (NACK) of the terminal after transmitting the data PDU 61.

The controller 150 controls a transmission operation of the transmitter 140 in accordance with windows of a base station and the terminal. Herein, the window means the size of the PDU that can be transmitted at once, and the window is previously promised in accordance with sizes of buffers that the terminal has. For example, the controller 150 has the list of the data ARQ blocks 21, 22, and 23 to be transmitted as a serial number, and controls the transmission by deleting the serial number of the data ARQ blocks 21, 22, and 23 that the terminal succeeds in receiving from the list. Meanwhile, when the data ARQ blocks 21, 22, and 23 succeed in transmission although the parity ARQ blocks 31 and 32 are not transmitted, the controller 150 regards that all the ARQ blocks 31 and 32 are also successfully transmitted.

Hereinafter, a transmitting method for a multicast and broadcast service according to an embodiment of the present invention will be described in detail with reference to FIG. 7.

FIG. 7 is a flowchart illustrating a transmitting method for a multicast and broadcast service according to an embodiment of the present invention.

Referring to FIG. 7, the multicast and broadcast service transmitting device 100 of a base station firstly encodes data to generate parity (S710). Thereafter, data ARQ blocks 21, 22, and 23 are generated by dividing data, and parity ARQ blocks 31 and 32 are generated by dividing the parity (S720).

Subsequently, the transmitting device 100 transmits the data ARQ blocks 21, 22, and 23 to a plurality of terminals (S730). At this time, the data ARQ blocks 21, 22, and 23 are transmitted in the form of a data PDU 61 including the header 51, the subheader 52, and the error checking fields 41, 42, and 43.

Thereafter, the transmitting device 100 receives a response on whether or not the data ARQ blocks 21, 22, and 23 are normally received from the plurality of terminals (S740). When the data ARQ blocks 21, 22, and 23 are normally received, the transmitting device 100 receives an acknowledge response (ACK), and when the data ARQ blocks 21, 22, and 23 are not normally received, the transmitting device 100 receives a non-acknowledge response (NACK).

The transmitting device 100 verifies the number of data ARQ blocks 21, 22, and 23 lost from information sent from each terminal (S750). At this time, the transmitting device 100 selects information that a terminal that loses the most data ARQ blocks 21, 22, and 23 sends, and verifies the number of the data ARQ blocks 21, 22, and 23 lost from the information.

Subsequently, the transmitting device 100 transmits the minimum number of parity ARQ blocks 31 and 32 that can restore the lost data ARQ blocks 21, 22, and 23 to each terminal (S760). The minimum number of ARQ blocks 31 and 32 are determined on the basis of the terminal that loses the most data ARQ blocks 21, 22, and 23. At this time, the parity ARQ blocks 31 and 32 are also transmitted in the form of the parity PDU 62 including the header 53, the subheader 54, and the error checking fields 44 and 45.

Thereafter, the transmitting device 100 receives a response on whether or not the lost data ARQ blocks 21, 22, and 23 are successfully restored from each terminal (S770).

When the data ARQ blocks 21, 22, and 23 are successfully restored, the transmitting device 100 receives the acknowledge response, such that the transmission process is terminated. When the data ARQ blocks 21, 22, and 23 are not successfully restored, the transmitting device 100 receives the non-acknowledge response and determines whether or not the parity ARQ blocks 31 and 32 are exhausted (S780).

When the parity ARQ blocks 31 and 32 remain, the transmitting device 100 transmits the parity ARQ blocks 31 and 32 to each terminal again (S760). Thereafter, the transmitting device 100 receives the response on whether or not the data ARQ blocks 21, 22, and 23 are successfully restored from the terminal again (S770).

When the parity ARQ blocks 31 and 32 are all exhausted by repeatedly performing the process, the transmitting device 100 directly transmits the lost data ARQ blocks 21, 22, and 23 to the terminal that transmits the non-acknowledge response (S790).

As described above, when the multicast and broadcast service transmits, the data can be transmitted to the plurality of terminals by using the ARQ transmission scheme in the media access control layer, thereby securing reliability of transmission.

Hereinafter, a receiving method for a multicast and broadcast service according to an embodiment of the present invention will be described in detail with reference to FIG. 8.

Figure 8:
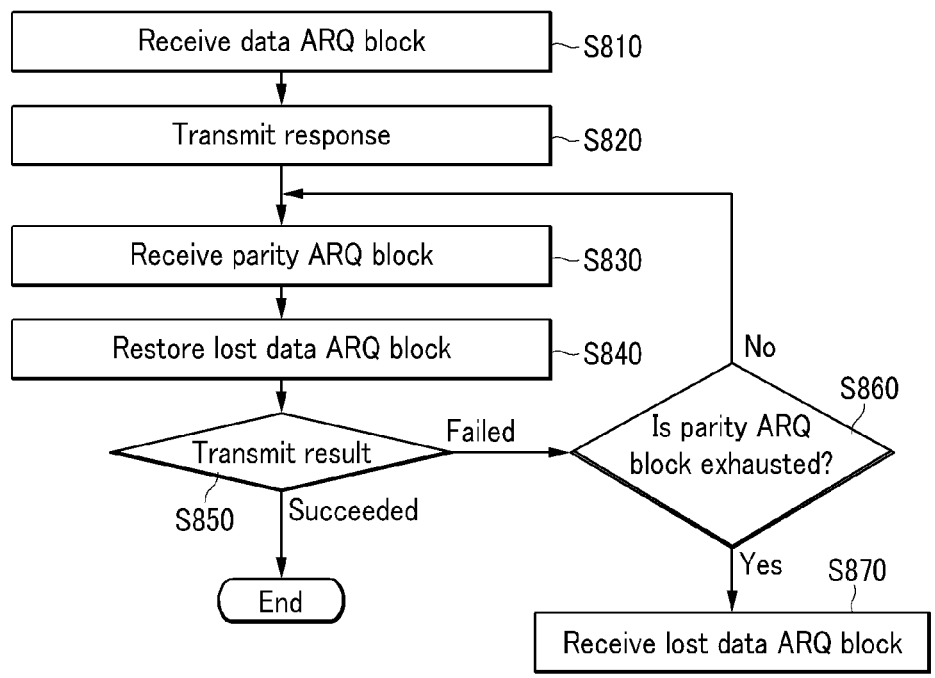
FIG. 8 is a flowchart illustrating a receiving method for a multicast and broadcast service according to an embodiment of the present invention.

FIG. 8 is a flowchart illustrating a receiving method for a multicast and broadcast service according to an embodiment of the present invention.

Referring to FIG. 8, first, the terminal receives the data ARQ blocks 21, 22, and 23 (S810). At this time, the data ARQ blocks 21, 22, and 23 are received in the form of a data PDU 61 including the header 51, the subheader 52, and the error checking fields 41, 42, and 43.

Thereafter, the terminal transmits a response on whether or not the data ARQ blocks 21, 22, and 23 are normally received to a base station (S820). When the data ARQ blocks 21, 22, and 23 are normally received, the terminal transmits the acknowledge response to the base station, and when the data ARQ blocks 21, 22, and 23 are abnormally received, the terminal requests retransmission by transmitting the non-acknowledge response to the base station.

When the data ARQ blocks 21, 22, and 23 are not normally received, the terminal receives the parity ARQ blocks 31 and 32 from the base station (S830).

Thereafter, the terminal restores the lost data ARQ blocks 21, 22, and 23 by using the received parity ARQ blocks 31 and 32 (S840).

Subsequently, the terminal transmits a restoration result to the base station (S850). When the result is determined as success, the receiving method is terminated, and when the result is determined as failure, the parity AQR blocks 31 and 32 are again received when the parity ARQ blocks 31 and 32 remain in the base station by determining whether or not the parity ARQ blocks 31 and 32 of the base station are exhausted (S830). Thereafter, the terminal restores the lost data ARQ blocks 21, 22, and 23 again (S840) and transmits the result to the base station (S850).

When the parity ARQ blocks 31 and 32 do not remain in the base station by repeatedly performing the process, the terminal directly receives the lost data ARQ blocks 21, 22, and 23 from the base station (S870).

The above-mentioned exemplary embodiments of the present invention are not embodied only by an apparatus and method. Alternatively, the above-mentioned exemplary embodiments may be embodied by a program performing functions, which correspond to the configuration of the exemplary embodiments of the present invention, or a recording media on which the program is recorded.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A transmitting device for a multicast and broadcast service, the transmitting device comprising:
    an encoder configured to receive data to generate parity;
    an ARQ block generator configured to generate first automatic repeat request (ARQ) blocks by dividing the data, and generate second ARQ blocks by dividing the parity;
    a PDU generator configured to generate a first protocol data unit (PDU) comprising a specified number of the first ARQ blocks and a second protocol unit (PDU) comprising a specified number of the second ARQ blocks; and
    a transmitter configured to:
        transmit the first PDUs to a plurality of terminals;
        receive a non-acknowledgement response from at least one terminal after transmitting the first PDU, the non-acknowledgement response indicating the number of lost first ARQ blocks;
        determine whether or not the second ARQ blocks are exhausted;
        when the second ARQ blocks are remaining, transmit the second PDU in accordance with the non-acknowledge response; and
        when the second ARQ blocks are exhausted, directly transmit the lost first ARQ blocks to the at least one terminal that transmitted the non-acknowledgement response.

2. The transmitting device of claim 1, wherein the encoder is further configured to use an encoding type that enables detecting and modifying an error in the unit of a symbol in a media access control layer.

3. The transmitting device of claim 2, wherein the encoder comprises a Reed-Solomon encoder.

4. The transmitting device of claim 1, wherein the specified number of second ARQ blocks comprises a minimum number of second ARQ blocks that allow the plurality terminals to restore the lost first ARQ blocks to the terminals.

5. The transmitting device of claim 4, wherein the minimum number of second PDUs that can restore the first ARQ block is determined based on a non-acknowledgement response from a terminal with the most lost first ARQ blocks among the plurality of terminals.

6. The transmitting device of claim 1, wherein each of the first PDU and the second PDU further comprises a header and error checking fields, and
    the header comprises control information of the first ARQ blocks and second ARQ blocks.

7. The transmitting device of claim 1, further comprising a controller configured to control a transmission operation of the transmitter according to windows of the transmitter and the terminal.

8. A transmitting method for a multicast and broadcast service in a base station, the transmitting method comprising:
    generating parity by encoding data;
    generating first ARQ blocks by dividing the data;
    generating second ARQ blocks by dividing the parity;
    generating a first protocol data unit (PDU) comprising the first ARQ blocks;
    generating a second PDU comprising a specified number of the second ARQ blocks;
    transmitting the first PDU to a plurality of terminals;
    receiving a non-acknowledgement response indicating the number of lost first ARQ blocks from at least one terminal after transmitting the first PDU;
    determining whether or not the second ARQ blocks are exhausted;
    when the second ARQ blocks are remaining, transmitting a specified number of the second PDU to the at least one terminal; and
    when the second ARQ blocks are exhausted, directly transmitting the lost first ARQ blocks to the at least one terminal that transmitted the non-acknowledgement response.

9. The transmitting method of claim 8, wherein the specified number of the second ARQ blocks comprises a minimum number of second ARQ blocks that allow the plurality of terminals to restore the lost first ARQ block.

10. The transmitting method of claim 9, wherein the minimum number of second ARQ blocks that can restore the first ARQ block is determined according to a non-acknowledgement response of a terminal with the most lost first ARQ blocks among the plurality of terminals.

11. The transmitting method of claim 8, wherein encoding the data comprises applying Reed-Solomon encoding.

12. A receiving method for a multicast and broadcast service in a terminal, the receiving method comprising:
    receiving a first protocol data unit (PDU) including first ARQ blocks generated by dividing data from a base station;
    transmitting a non-acknowledgement response indicating a number of lost first PDUs to the base station;
    receiving a second PDU including at least one of second ARQ blocks generated by dividing parity generated by encoding the data when the second ARQ blocks are remaining;
    restoring the lost first ARQ block by using the at least one of second ARQ blocks;
    transmitting a restoration result to the base station; and
    when the second ARQ blocks are exhausted, directly receiving the lost first ARQ blocks from the at least one terminal that transmitted the non-acknowledgement response.

13. The receiving method of claim 12, further comprising, when the restoration result comprises the non-acknowledge response, re-receiving the second PDU from the base station when the second ARQ blocks are remaining; and
    when the second ARQ blocks are exhausted, directly receiving the lost first ARQ blocks from the base station.

14. The receiving method of claim 12, wherein the encoding the data comprises applying Reed-Solomon encoding.

* * * * *